(12) United States Patent
Chase et al.

(10) Patent No.: US 12,355,873 B1
(45) Date of Patent: Jul. 8, 2025

(54) SECURE CRYPTOGRAPHIC SECRET BOOTSTRAPPING IN A PROVIDER NETWORK

(71) Applicant: Amazon Technologies, Inc., Seattle, WA (US)

(72) Inventors: Eric Chase, Seattle, WA (US); Derin L Fleming, Seattle, WA (US); Jackson Hill, Renton, WA (US)

(73) Assignee: Amazon Technologies, Inc., Seattle, WA (US)

( * ) Notice: Subject to any disclaimer, the term of this patent is extended or adjusted under 35 U.S.C. 154(b) by 287 days.

(21) Appl. No.: 18/128,711

(22) Filed: Mar. 30, 2023

(51) Int. Cl.
*H04L 9/08* (2006.01)
*G06F 21/72* (2013.01)
*G06F 21/62* (2013.01)
*G06F 21/81* (2013.01)

(52) U.S. Cl.
CPC ............ *H04L 9/0877* (2013.01); *G06F 21/72* (2013.01); *H04L 9/0819* (2013.01); *H04L 9/0897* (2013.01); *G06F 21/62* (2013.01); *G06F 21/81* (2013.01); *H04L 9/0822* (2013.01)

(58) Field of Classification Search
CPC ....... H04L 9/08; H04L 9/0877; H04L 9/0897; H04L 9/0822; G06F 21/57; G06F 21/60; G06F 21/62; G06F 21/6218; G06F 21/6245; G06F 21/70; G06F 21/72; G06F 21/78; G06F 21/81
See application file for complete search history.

(56) References Cited

U.S. PATENT DOCUMENTS

| | | | | |
|---|---|---|---|---|
| 9,594,638 | B2 * | 3/2017 | Potlapally | G06F 21/57 |
| 10,565,382 | B1 * | 2/2020 | Diamant | H04L 9/0897 |
| 2016/0026810 | A1 * | 1/2016 | Hagiwara | G06F 21/86 |
| | | | | 713/193 |
| 2020/0213191 | A1 * | 7/2020 | Watsen | H04L 61/5014 |
| 2022/0207155 | A1 * | 6/2022 | Chhabra | G06F 21/602 |
| 2023/0261867 | A1 * | 8/2023 | Makhalov | H04L 9/0822 |
| | | | | 713/189 |

OTHER PUBLICATIONS

Wikipedia, "FIPS 140", available online at <https://en.wikipedia.org/wiki/FIPS_140>, Retrieved on Mar. 28, 2023, Last Edited on Jul. 10, 2022, 4 pages.

(Continued)

*Primary Examiner* — Shaqueal D Wade-Wright
(74) *Attorney, Agent, or Firm* — Nicholson De Vos Webster & Elliott LLP

(57) ABSTRACT

Techniques for secure cryptographic secret bootstrapping balance the need to quickly and conveniently restore cryptographic secrets to server computers in the event of an outage with the need for security. Before the outage, a server computer uses a trusted platform module of the server computer to seal an encryption key used to encrypt a secret stored at the server computer. In response to the outage, the server computer restores the secret by using the trusted platform module to unseal the encryption key and then using the unsealed encryption key to decrypt the encrypted secret. The techniques can be used to restore cryptographic secrets rapidly and securely to a cluster of server computers used for cryptographic operations in a provider network without the overhead of safe room procedures.

20 Claims, 7 Drawing Sheets

(56) References Cited

OTHER PUBLICATIONS

Wikipedia, "Hardware Security Module", Available Online at <https:en.wikipedia.org/wiki/Hardware_security_module>, Retrieved on Mar. 28, 2023, Last Edited on Dec. 19, 2022, 5 pages.

Wikipedia, "Trusted Platform Module", Available Online at <https://en.wikipedia.org/wiki/Trusted_Platfrom_Module>, Retrieved on Mar. 28, 2023, Last Edited on Feb. 26, 2023, 23 pages.

\* cited by examiner

SECURE CRYPTOGRAPHIC SECRET BOOTSTRAPPING IN A PROVIDER NETWORK

BACKGROUND

The convenience of security safeguards with respect to cryptographic secrets that are used by computers to perform cryptographic operations can affect the usefulness of those safeguards. Consider an example of a server computer in a data center that stores a cryptographic secret in volatile memory of the server. For example, the cryptographic secret may encompass an asymmetric key pair used by the server to carry out cryptographic operations. Best security practices may include never persisting the cryptographic secret to non-volatile memory of the server and never transmitting the cryptographic secret unencrypted outside the secure confines of the server.

Unfortunately, if power to the server is lost, then, due to the nature of volatile memory, the cryptographic secret is lost as well. When power is restored to the server, the cryptographic secret may need to be restored to the server so that it may continue performing cryptographic operations. One way to do this restoration is to use an "offline" vault. The offline vault is a physically secured and isolated computer device that stores a highly sensitive cryptographic information such as, for example, a root cryptographic key material (e.g., a root symmetric key or a root asymmetric key pair) used to sign or encrypt other lower-level cryptographic key material. The root cryptographic material itself may be the secret or the root cryptographic material may be used to regenerate the cryptographic secret such as by cryptographically signing or encrypting data to regenerate the secret.

To protect the root cryptographic material, this restoration procedure is sometimes done in a "safe room" which is a physically secure and digitally isolated area or environment that is heavily secured and protected from both internal and external threats where the root cryptographic material can be accessed and used with little or no risk of compromise. For example, the safe room may be a physical location where all access points such as doors, windows, and network connections are strictly controlled, and only authorized personnel are granted access. The room may be equipped with advanced security measures such as biometric authentication, surveillance cameras, motion sensors, and intrusion detection systems to deter unwanted access or behavior and detect any suspicious activity.

While highly secure, restoration of the cryptographic secret to the server using a safe room is not convenient. It may take hours and multiple on-site persons to bring the server and the offline vault together in the safe room environment. Using a safe room for restoration also does not scale well. Consider an entire data center outage where cryptographic secrets need to be restored to hundreds or even thousands of server computers. Using a safe room to restore cryptographic secrets to all these servers could take days during which computing applications that are critical to the operation of businesses, governments, and other organizations are unavailable.

Techniques described herein address these and other issues.

BRIEF DESCRIPTION OF DRAWINGS

Various examples in accordance with the present disclosure will be described with reference to the drawings, in which.

DETAILED DESCRIPTION

Figure 1:
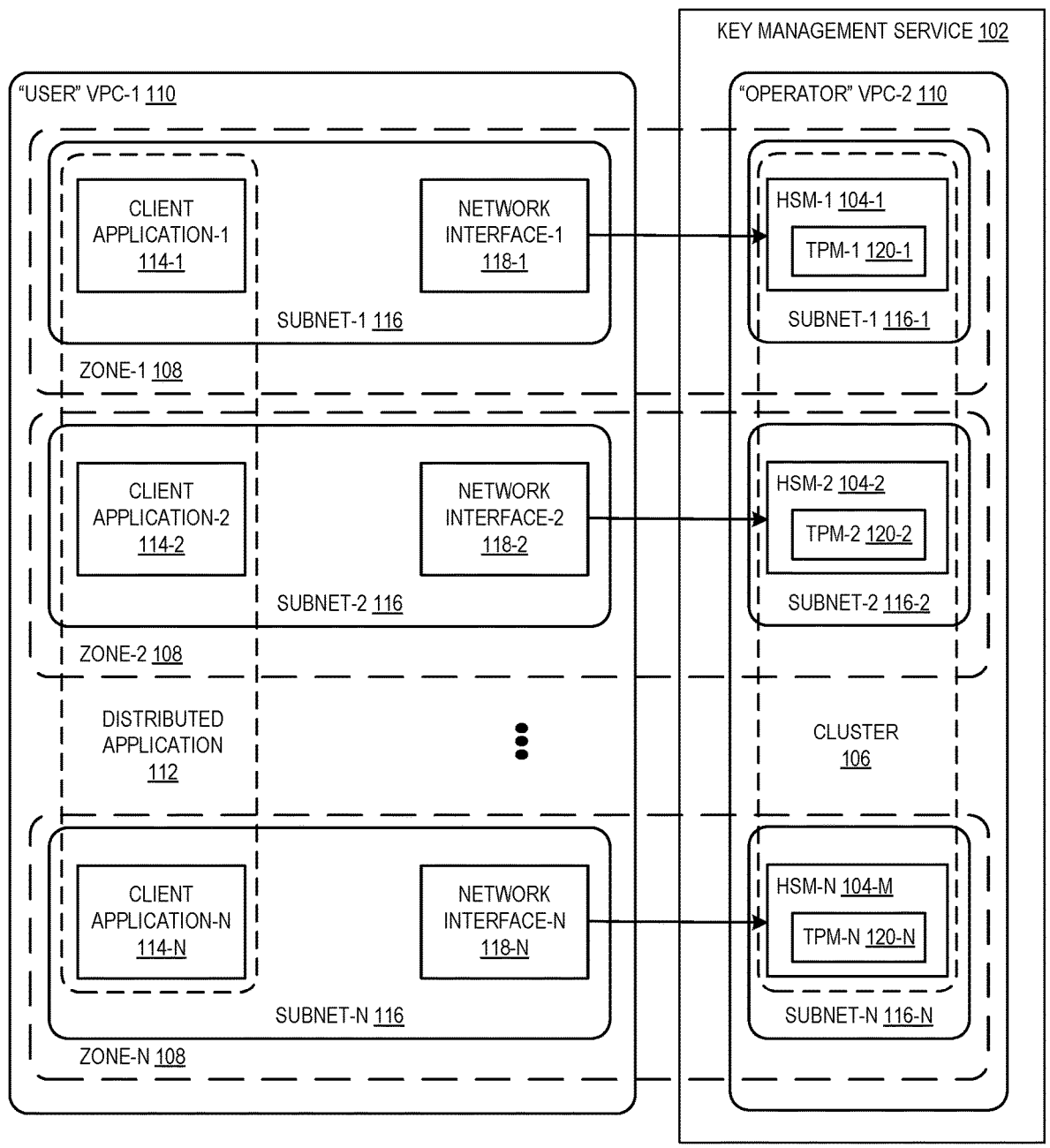
FIG. 1 illustrates an example provider network environment in which the techniques for secure cryptographic secret bootstrapping can be implemented.

The present disclosure relates to methods, systems, and non-transitory computer-readable media (collectively "techniques") for secure cryptographic secret bootstrapping in a provider network.

A safe room is a very secure way to restore cryptographic secrets to server computers after an outage. Unfortunately, the safe room solution does not scale well when cryptographic secrets need to be restored to relatively many server computers. So, a scalable solution is needed. Along with the need for scalability, there is a need for security.

Techniques herein balance the need to restore cryptographic secrets quickly and conveniently to server computers after an outage with the need for security, using in some embodiments a cryptographic secret bootstrapping client ("bootstrap client") in a provider network that before an outage sends requests to export cryptographic secrets to server computers in the provider network that store the cryptographic secrets in their volatile memories. In response to a server computer receiving a request to export, the cryptographic secret is encrypted at the server computer using a symmetric key to yield an encrypted cryptographic secret. A trusted platform module (TPM) of the server computer is used to seal the symmetric key. The encrypted cryptographic secret and the sealed symmetric key are then returned to the bootstrap client.

After an outage of the server computers, the bootstrap client sends requests to import the cryptographic secrets to the server computers. The request to import sent to a server computer includes the sealed symmetric key and the encrypted cryptographic secret previously exported from that server computer before the outage. In response to the server computer receiving the request to import, the trusted platform module of the server computer is used to unseal the sealed symmetric key to obtain the (unsealed) symmetric key. The (unsealed) symmetric key is then used to decrypt the encrypted cryptographic secret. The (decrypted) cryptographic secret is then stored in volatile memory of the server computer for use by the server computer to perform cryptographic operations. Because the symmetric key used to encrypt the cryptographic secret is sealed using the trusted platform module of the server computer, the sealed symmetric key can only be unsealed using the trusted platform module of the server computer. Because the requests to export and the requests to import can be sent to server computers over a computer network connecting the bootstrap client and the server computers and because the export and import operations can be performed at the server computers automatically, cryptographic secrets can be restored to multiple server computers such as, for example, hundreds or thousands of server computers in a data center, in a relatively short amount of time compared to a safe room-based restoration solution.

As an example of the problem addressed by the techniques herein, consider a fleet of hardware security modules (HSM) deployed within a data center of a provider network. An HSM is a physical computing device that provides a secure environment for storing and managing cryptographic keys and other sensitive cryptographic data referred to herein as "cryptographic secrets." For example, an HSM may be a multi-chip standalone hardware cryptographic appliance designed to provide dedicated cryptographic functions to meet the security and scalability requirements of a cryptographic key management service in the provider network. The cryptographic boundary of an HSM is defined as the secure chassis of the appliance. All cryptographic secrets may be maintained exclusively in volatile memory in the appliance and erased immediately upon detection of physical tempering.

In operation, the HSMs in the fleet may store cryptographic secrets in volatile memory of the HSMs. Such cryptographic secrets may include cryptographic keys (e.g., a symmetric key or a private key of an asymmetric key pair) or digital certificates (e.g., a self-signed certificate). The HSMs may use the cryptographic secrets to perform cryptographic operations to secure various applications and systems, including online transactions, Virtual Private Networks (VPNs), Transport Later Security (TLS), encrypting and decrypting data, Public Key Infrastructure (PKI), etc.

As used herein, a "cryptographic key" encompasses data used in encryption and decryption algorithms to secure communication and protect data privacy. There are two types of cryptographic keys: symmetric and asymmetric. Symmetric keys use the same key for both encryption and decryption, and therefore, the same key must be kept secret by both the sender and receiver of the message. Examples of symmetric key algorithms include Advanced Encryption Standard (AES) and Data Encryption Standard (DES). Asymmetric keys, also known as public-key cryptography, use two different but mathematically related keys, one for encryption and another for decryption. The public key is widely shared and used for encrypting messages, while the private key is kept secret and used for decrypting messages. Examples of asymmetric key algorithms include RSA and Diffie-Hellman.

In the event of an outage that results in the loss of power to the entire fleet of HSMs, the cryptographic secrets stored in the volatile memory of the HSMs may be lost. When power is restored to the HSMs, the cryptographic secrets may need to be restored to the HSMs as well. Restoring the cryptographic secrets to the HSMs by bringing them to a safe room environment does not scale well for relatively large fleets. Thus, a restoration solution that can securely restore the cryptographic secrets to the HSMs after recovery from an outage without requiring a safe room environment is very important.

The quick restoration of cryptographic secrets is not only important for the provider network operator, whose revenue depends on satisfied users, but also to the users themselves who may run mission-critical applications on the provider network infrastructure that critically rely on the cryptographic operations performed by the fleet of HSMs for proper application operation. If a user's mission-critical application is down for an extended time (e.g., a day or days) waiting for the provider network operator to complete a safe room restoration procedure, then the user themselves may lose revenue and the goodwill of their users of the application. If the user is a government agency or a healthcare provider or other public supporting organization then the consequences of delayed restoration could possibly even be greater than just lost revenue. The techniques herein provide for restoration of cryptographic secrets in a provider network that is secure and rapid.

In some embodiments, the techniques herein use HSMs configured with Trusted Platform Modules (TPMs). A TPM is a specialized hardware chip or dedicated microcontroller that complies with a standard (ISO/JEC 11889). A TPM is designed to provide secure storage and processing of cryptographic keys and other sensitive data. A TPM is sometimes referred to as a "secure cryptoprocessor." A TPM may be installed on the motherboard or otherwise connected to an HSM that hosts the TPM.

A HSM that incorporates a TPM can "seal" data, such that the data can only be "unsealed" under conditions under which the data was sealed. In particular, the TPM can encrypt the data in such a way that it is tied to certain HSM platform measurements at the time sealing. These platform measures are stored in "Platform Configuration Registers" or "PCRs" of the TPM. This data can be unsealed only when those platform measurements have the same values that they had when the data was sealed. This process is sometimes referred to as "sealing" the data to the TPM.

Decrypting the data by the TPM when those platform measurements have the same values that they had when the cryptographic key was created is called "unsealing." With the TPM, private portions of root cryptographic keys and root cryptographic key pairs are kept separate from the memory that is controlled by the operating system of the HSM that hosts the TPM. Data can be sealed to the TPM, and certain assurances about the state of the HSM (assurances that define the trustworthiness of the HSM) can be made before the data is unsealed and released for use. The TPM uses its own internal firmware and logic circuits to process instructions. Hence, the TPM does not rely on the operating system of the HSM and the TPM is not exposed to vulnerabilities that might exist in the operating system or application software of the HSM.

Because, according to the techniques herein, the symmetric key used to encrypt the cryptographic secret of the HSM is sealed to the TPM of the HSM, the sealed symmetric key can only be decrypted (unsealed) by a TSM only when the HSM PCRs tied to the sealed symmetric key have the same values that they had when the symmetric key was sealed. As a result, the sealed symmetric key and the encrypted cryptographic secret can be safely stored outside the confines of the HSM in the event they need to be used to restore the cryptographic secret to the HSM after a loss of power to the HSM.

The techniques proceed in some embodiments by a HSM receiving a request to export a cryptographic secret stored in volatile memory of the HSM. In response to receiving the request to export, the cryptographic secret is encrypted at the HSM using a symmetric key to yield an encrypted cryptographic secret. A TPM of the HSM is requested to seal the symmetric key to yield a sealed cryptographic key.

In the event of an electrical power outage causing the HSM to lose electrical power, the HSM may receive a request to import the cryptographic secret after power is restored to the HSM. The request to import may include the previously exported sealed symmetric key and the encrypted cryptographic secret.

In response to receiving the request to import the cryptographic secret, the TPM of the HSM is requested to unseal the sealed symmetric key to yield the symmetric key. The unsealed symmetric key is then used at the HSM to decrypt the encrypted secret into volatile memory of the HSM, thereby restoring the cryptographic secret to the HSM that was lost because of the electrical power outage.

While in some embodiments the techniques disclosed herein are used to export and import cryptographic secrets from and to HSMs, the techniques can be used to export and import other types of secrets. The techniques can be used to export and import any sensitive data for which certain security controls and protections are implemented to safeguard the secret from unauthorized access, disclosure, and modification. An exported and imported secret can be a cryptographic secret such as a private key of a symmetric key pair, a symmetric key, or a self-signed digital certificate (X.509 certificate) that establishes a cryptographically verifiable identity of an HSM. Additionally or alternatively, a secret can also encompass non-cryptographic data such as personally identifiable information (PII) (e.g., name, address social security number, date of birth, driver's license numbers), passwords, financial information (e.g., bank account details, credit card numbers, text identification numbers), health information (e.g., health insurance information, mental health records), legal information (e.g., court records, legal contracts, and intellectual property), government information (e.g., classified information, national security information, and military secrets), employee information (e.g., employment contracts, payroll information, performance reviews), education information (e.g., student records, transcripts), personal electronic communications (e.g., emails, text messages, instant messages), or any other data that if disclosed or accessed in plaintext form could result in harm, identity theft, financial loss, reputational damage, or other negative consequences.

Example Provider Network Environment

FIG. 1 illustrates an example provider network environment in which the techniques for secure secret bootstrapping can be implemented.

Provider network 100 is a cloud computing platform providing infrastructure and application services that allow users to build and deploy scalable, flexible, and cost-effective applications in the cloud. Provider network 100 may offer a wide range of cloud services including computing, storage, networking, database, analytics, machine learning, security, and Internet of Things (IoT) services. These services can be used by users to build a variety of applications, such as websites, mobile apps, big data processing, and artificial intelligence (AI) applications. The operator of provider network 100 may charge users according to various payment models including a pay-as-you-go pricing model where users pay for the resources in the provider network they use.

One service that provider network 100 offers is a cryptographic key management service 102, alternatively "KMS 102". KMS 102 allows users to create and control cryptographic keys that are used to protect data. KMS 102 uses HSMs to protect and validate cryptographic keys under certification program such as, for example, a Federal Information Processing Standard (FIPS) such as FIPS 140-2, FIPS 140-3, or the like.

Cryptographic key management service 102 integrates with other services in provider network 100 to encrypt data. Cryptographic key management service 102 can be used to create, edit, and view cryptographic keys including symmetric keys and asymmetric key pairs. A symmetric key can a 256-bit AES-GCM encryption key or the like. An asymmetric key pair presents a mathematically related RSA or elliptic curve (ECC) public cryptographic key and private key pair or the like. HSMs of cryptographic key management service 102 may perform cryptographic operations using cryptographic keys such as encrypting, decrypting, and re-encrypting data using symmetric keys or asymmetric key pairs, cryptographically signing and verifying messages using asymmetric key pairs, generating exportable symmetric keys and asymmetric key pairs, and generating random numbers suitable for cryptographic applications.

A HSM is a computing device that processes cryptographic operations and provides secure storage for cryptographic keys. An HSM can support various uses cases including offloading the SSL or TLS processing for web servers (sometimes referred to a "SSL acceleration" or "TLS acceleration"). Offloading reduces the computational burden on web servers and provides extra security by storing the server's private key of an asymmetric key pair (an example of a cryptographic secret) in the HSM. Another use case for HSMs is protecting the private keys of asymmetric key pairs (an example of a cryptographic secret) for an issuing certificate authority (CA). The private keys can be stored in HSMs and used to perform cryptographic signing operations. Yet another use case for HSMs is encrypting data such as database table data before persisting the encrypted data to non-volatile memory. HSMs can be used to store a symmetric key (an example of a cryptographic secret) used to encrypt data. These are just some examples of possible use cases for HSMs. Other uses cases are possible, and the techniques herein are not limited to any particular HSM use case.

An HSM of cryptographic key management service 102 is configured with a Trusted Platform Module (TPM). The TPM can encompass a microchip or microcontroller connected to the HSM via a specialized interface sometimes referred to as a TPM header or a TPM connector. The header or connector may be located on the motherboard of the HSM and the TPM may be inserted into the header or connector and secured in place with a chip or a screw. Once installed, the TPM can be activated in the HSM using the HSM's BIOS or UEFI firmware. By doing so, the HSM's operating system (e.g., LINUX, WINDOWS, etc.) and applications that run on the operating system of the HSM can interact with the TPM and utilize its security capabilities. An HSM can have a built-in TPM chip that is integrated directly into the motherboard of the HSM. Alternatively, the TPM can be a separate module that is installed into the motherboard of the HSM.

The TPM provides hardware-based security capabilities, including cryptographic keys, random number generation, and secure storage. The TPM can be designed to provide a secure foundation for various computing environments, such as HSMs, personal computers, servers, and embedded systems. The TPM can be designed to protect against attacks that can compromise the integrity of the HSM, such as rootkits, malware, and unauthorized access. The TPM provides a secure environment for sensitive data, including passwords, cryptographic keys, and digital certificates. The TPM can also be used to perform secure boot operations and to establish secure communications between devices. The TPM can be used in enterprise environments to provide a secure foundation for network security, such as with Virtual Private Networks (VPNs), network authentication, and secure communications.

The TPM can encompass several components. A cryptographic processor of the TPM performs cryptographic operations such as encryption, decryption, and digital signatures. The TPM may include a non-volatile memory used to store sensitive data, such as cryptographic keys, digital certificates, and other security-related information. The TPM may include a random number generator module used to generate random numbers for use in cryptographic operations and other security-related purposes. The TPM may include a set of Platform Configuration Registers (PCRs) used to store measurements of the HSM's configuration, such as the boot process, firmware, and software. These measurements can be used to detect a change in the HSM's configuration, which may indicate a tampering or other security breach. The TPM may include several mechanisms for detecting tampering, such as physical intrusion detection, voltage and temperature monitoring, and clock frequency monitoring. These mechanisms are designed to detect attempts to comprise the integrity of the TPM or the HSM it is protecting.

The TPM can be used to seal data. Sealing data encompasses the TPM encrypting the data in a way that it can only be decrypted and accessed under certain conditions. This helps protect the data from unauthorized access and ensures that it has not been tampered with. Sealing typically involves encrypting the data using a sealing cryptographic key under sealing conditions. The sealing cryptographic key is a cryptographic key that is generated by the TPM. The sealing cryptographic key is used by the TPM to encrypt the data. Typically, the sealing cryptographic key cannot be accessed or exported outside the TPM. The data to be sealed is encrypted by the TPM using the sealing cryptographic key and stored within the TPM's non-volatile memory. The conditions under which the data can be decrypted by the TPM are set at the time of sealing. For example, the data may only be decrypted if certain PCRs of the TPM have specific values, indicating that the HSM and the TPM have not been tampered with. When unsealing the data, the TPM verifies that the sealing conditions are met. If so, the TPM decrypts the sealed data using the sealing cryptographic key.

Cryptographic key management service 102 provides a set of HSMs 104-1, 104-2, . . . , 104-N (collectively "HSMs 104") in cluster 106. Cluster 106 encompasses a set of individual HSMs 104 that are kept synchronized by cryptographic key management service 102. Because of this synchronization, cluster 106 effectively provides one logical HSM to distributed application 112 with load balancing, failover, or high availability. Cluster 106 may be provisioned for a particular user of provider network 100. Cryptographic key management service 102 may encompass many such clusters for many different users of which cluster 106 is one example. Each of HSMs 104 includes a respective TPM 102-1, 102-2, . . . , 102-N.

Cluster 106 includes HSMs 104 in different zones 108-1, 108-2, . . . , 108-N (collectively "zones 108") of cryptographic key management service 102. Each of zones 108 corresponds to a distinct location within a data center or a cloud computing region of provider network 100 that is designated to be isolated from failures in other zones. Each of zones 108 may be housed in a separate physical facility (data center), with its own power, network, and connectivity infrastructure.

Zones 108 are designed to provide redundancy and fault tolerance for critical applications and services. By deploying cluster 106 across zones 108, the user of cluster 108 can ensure that the logical HSM remains available even if one of the zones 108 experiences a disruption. Zones 108 can all be in the same region of provider network 100. A region is a geographic area that contains one or more zones. A region is typically a larger geographic area that spans multiple data centers, whereas a zone is a smaller, isolated location within a region. While zones 108 can all be in a single region of provider network 100, zones 108 can be distributed across multiple regions of provider network 100. It is also possible for one or more or all of HSMs 104 of cluster 106 to be located in the same zone (e.g., in the same data center).

Additionally, or alternatively, although not depicted in FIG. 1, some or all of HSMs 104 may be located outside provider network 100 such as on the premises of a user of provider network 100. For example, a user of provider network 100 may use provider network 100 to host their distributed application 112 (e.g., a web site) where cluster 106 performs cryptographic operations (e.g., TLS offloading) for distributed application 112 but where cluster 106 and HSMs 104 are located on a network outside provider network 100 (e.g., an on-premises network of the user).

In any case, an event may occur that causes all HSMs 104 of cluster 106 to lose electrical power for a time. The event can be catastrophic weather or geopolitical event (e.g., a cyberattack), for example. Eventually, electrical power may be restored to the HSMs 104 of cluster 106. In this case, the techniques herein may be used to securely restore cryptographic secrets to HSMs 104 of cluster 106 that were stored in volatile memory of HSMs 104 before the event and lost when electrical power to HSMs 104 was lost.

In the example of FIG. 1, cluster 106 is hosted by cryptographic key management service 102 in virtual private cloud VPC-2 110. VPCs 110 are private virtual networks that are provisioned within provider network 100 to users. VPCs 110 allows users of provider network 100 launch resources such as virtual machine instances, storage devices, and databases in a virtual network that is logically isolated from other networks. Since VPCs 110 are logically isolated from other networks, VPCs 110 provide an additional layer of security for applications and data. VPCs 110 may also provide customization options where users can customize network (IP) address ranges, create subnets, and configure routing tables to suit the requirements of a particular implementation at hand. VPCs 110 may provide scalability in terms of the ability to be scaled up or down as per a user's requirements. VPCs 110 may also be more cost-effective than setup a physical private network.

In the example of FIG. 1, VPC-2 110 is provisioned and managed by the operator of provider network 100. VPC-1 110 is provisioned to a user of provider network 100 and includes a user's distributed application 112 that encompass client application instances 114-1, 114-2, . . . , 114-N (collectively "client application instances 114"). Distributed application 112 may be a web server application, a database application, a machine learning application, or other distributed software application that uses the cryptographic services offered by cryptographic key management service 102. For example, distributed application 112 may be implemented by one or more other services available in provider network 100. For example, distributed application 112 may be implemented by any or all of the following services in provider network 100 that could be available to users for building distributed applications like application 112: an application service (e.g., enabling users to deploy and manage web, mobile, and API applications in the cloud), a functions service (e.g., allowing users to run code on-demand, without the need to provision or manage infrastructure), a container service (e.g., making it easy for users to deploy, scale, and manage containerized applications), a relational database service (e.g., providing high availability, automatic backups, and built-in security features), a globally distributed, multi-model database service (e.g., supporting multiple data models including document, key-value, graph, and column-family), a content delivery network service (e.g., accelerating the delivery of static and dynamic web content including videos, images, and web applications), an Application Programming Interface (API) management service (e.g., enabling users to create, publish, and manage APIs, as well as to secure and monitor access to them), or a cloud data storage service (e.g., providing scalable and durable storage for objects, files, and unstructured data).

Client application instances 114 are in different zones 108 like HSMs 104 are in different zones 108. When cluster 106 and HSMs 104 are provisioned to a user, the user may specify their VPC-1 110 including subsets 116-1, 116-2, . . . , 116-N (collectively "subsets 116") thereof to cryptographic key management service 102. In the provisioning of cluster 106 or HSMs 104 to user, cryptographic key management service 102 provisions network interfaces 118-1, 118-2, . . . , 118-N (collectively "network interfaces 118") in subnets 116 of the user's VPC-1 110. Network interfaces 118 provide interfaces in user's VPC-1 110 for application instances 114 and distributed application 112 to interact with HSMs 104 of cluster 106 in operator's VPC-2 110.

When the user requests cryptographic key management service 102 to provision cluster 106, the request specifies VPC-1 110 and subnets 116 in VPC-1 110. In the example of FIG. 1, one of subnets 116 of VPC-1 110 is provisioned each of zones 108. Subsets 116 may be provisioned by provider network 100 to the user at the time the provider network 100 provisions VPC-1 110 to the user.

When the user requests cryptographic key management service 102 to provision one of HSMs 104 in cluster 106, the request specifies cluster 106 and one of the zones 108 for the HSM. Provisioning HSMs 104 in different zones 108 provides redundancy and high availability in case one of zones 108 is unavailable.

When the user requests cryptographic key management service 102 to provision one of HSMs 104 in cluster 106, cryptographic key management service 102 provisions one of network interfaces 118 in one of subnets 116 of the user's VPC-1 110. Network interfaces 118 are the interfaces for interacting with HSMs 104 of cluster 106. HSMs 104 reside in separate VPC-2 110 that is owned by the operator of provider network 100. Each of HSMs 104 and its corresponding network interface of network interfaces 118 are provisioned in the same zone of zones 108.

Cryptographic key management service 102 is configured to automatically keep HSMs 104 of cluster 106 in sync including cryptographic secrets stored at HSMs 104. When a new HSM is added to cluster 106, cryptographic key management service 102 makes a backup copy of cryptographic secrets on an existing HSM in cluster 106 and then restores the backup copy to the new HSM over a cryptographically secured network communications channel (e.g., a HTTPS channel). A similar synchronization mechanism may be used to keep existing HSMs 104 synchronized with respect to cryptographic secrets stored at HSMs 104 of cluster 106.

Cluster 106 of HSMs 106 provides load balancing where cryptographic key management service 102 distributes cryptographic operations across HSMs 104 of cluster 106 based on each of HSMs 104 current capacity for additional processing. HSMs 104 in different zones 108 provides high availability in the event of unavailability of one or more but less than all of zones 108.

Figure 2:
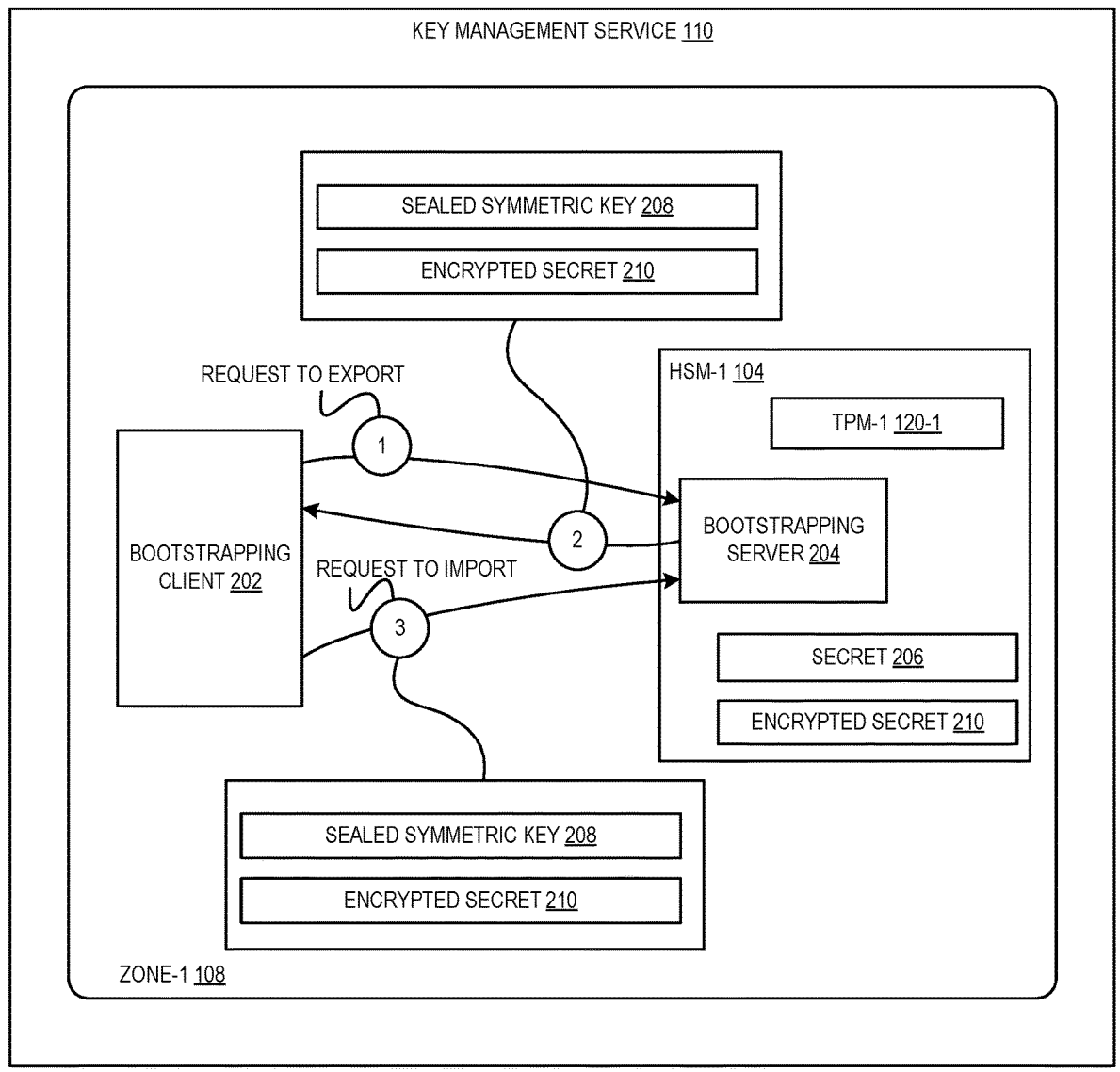
FIG. 2 illustrates an example system and an example method for secure cryptographic secret bootstrapping in a provider network.

Example System and Method for Secure Cryptographic Secret Bootstraping in a Provider Network FIG. 2 illustrates an example system and an example method for secure cryptographic secret bootstrapping in a provider network. Each zone in provider network 100 may include at least one bootstrapping client. FIG. 2 illustrates bootstrapping client 202 in zone-1 108. Bootstrapping client 202 executes as a software application or program on a computing device in zone-1 108. A bootstrapping client in each zone of provider network 100 is responsible for coordinating the export and import of secrets from and to HSMs in their zone. For example, a bootstrapping client in a zone can export a cryptographic secret from one HSM of a cluster of HSMs in the zone before an electrical power failure event that causes all HSMs of the cluster to lose electronical power and, after electrical power is restored to the HSMs in the cluster, import the previously exported cryptographic secret to all HSMs in the cluster. The bootstrapping client can assume this responsibility for one or more or all clusters in the zone.

Each HSM in a zone is configured with a bootstrapping server for handling requests to export a cryptographic secret and requests to import a cryptographic secret from the bootstrapping client in the zone. The bootstrapping server may be a process or daemon that listens on a network socket of the HSM (e.g., a UDP or TCP socket). For example, the bootstrapping server can execute as a process or daemon managed by or as part of an operating system (e.g., LINUX or Windows) installed on the HSM. Communications between the bootstrapping client and the bootstrapping server within the zone can be via a data communications network (e.g., an IP network) over a secured network communications channel such as one secured via TLS, SSL or the like or using other cryptographic encryption mechanism to secure network communications between the bootstrapping client and the bootstrapping server. For extra security, the bootstrapping server can also require the bootstrapping client to authenticate via a digital certificate challenge such as via the TLS protocol or the like before accepting requests to export and request to import from the bootstrapping client.

Each HSM of each cluster in each zone may store one or more cryptographic secrets in volatile memory of the HSM. For example, HSM-1 104 of cluster 106 in zone-1 108 stores cryptographic secret 206 in volatile memory of HSM-1 104. By virtue of the synchronization of cryptographic secrets among HSM in a cluster, each HSM in a particular cluster may store the same cryptographic secret. For example, each of HSMs 104 of cluster 106 may store cryptographic secret 206 in their volatile memories. Cryptographic secret 206 may be any sensitive data for which certain security controls and protections are implemented to safeguard cryptographic secret 206 from unauthorized access, disclosure, and modification. For example, cryptographic secret 206 can be a private key of an asymmetric key pair, a symmetric key, or a self-signed digital certificate (X.509 certificate) that establishes a cryptographically verifiable identity of an HSM.

In some embodiments, cryptographic secret 206 is stored predominately or exclusively in volatile memory of a HSM to provide a level of protection against unauthorized access due to the nature of volatile memory that losses its contents when power is removed. However, a cryptographic secret protected by the techniques herein is not required to be exclusively stored in volatile memory and a secret may be temporarily stored from time-to-time in non-volatile memory of a HSM or server computer such as, for example, to be accessible after a system reboot for the HSM or server computer.

Steps of the method for secure cryptographic secret bootstrapping in provider network 100 are depicted in FIG. 2 by numbered circles that overlay directed arrows. The directed arrows represent a direction of data flow but not necessarily the exclusive direction. The steps of the method can be performed in the order indicated by the numbered circles. However, unless the context clearly indicates otherwise, steps can be performed in different orders, concurrently, or in parallel.

At circle "1", bootstrapping client 202 sends a request to export cryptographic secret 206 to bootstrapping server 204 at HSM-1 104. In some embodiments, the request to export includes a symmetric key to be used to encrypt secret 206. For example, bootstrapping client 202 may pre-generate the symmetric key before sending the request to export that includes the pre-generated symmetric key to bootstrapping server 204. Bootstrapping client 202 may generate the symmetric key using a suitable cryptographic key generation program such as openssl or the like. Alternatively, bootstrapping client 202 may obtain the pre-generated symmetric key from a database or a file system where the symmetric key was pre-generated by another program or process.

Bootstrapping server 204 receives the request to export. In response to receiving the request to export, bootstrapping server 204 encrypts cryptographic secret 206 using a symmetric key. In some embodiments, bootstrapping server 204 uses a symmetric key provided by bootstrapping client 202 in the request to export to encrypt secret 206. In some embodiments, bootstrapping server 204 uses an existing symmetric key stored at HSM-1 104 such as a symmetric key stored by TPM-1 120-1 or in a file system of HSM-1 104 or an existing symmetric key obtained from elsewhere such as a network-connected database system or other device. In some embodiments, bootstrapping server 204 generates a symmetric key to use to encrypt cryptographic secret 206 in response to receiving the request to export using a suitable cryptographic key generation program such as openssl or the like. In any case, bootstrapping server 204 encrypts cryptographic secret 206 using a received, existing, or generated symmetric key to yield encrypted cryptographic secret 210 at HSM-1 104. Also, in response to receiving the request to export, bootstrapping server 204 requests TPM-1 120 to seal the symmetric key used to encrypt cryptographic secret 206. Bootstrapping server 204 obtains sealed symmetric key 208 from TPM-1 120-1 as a result.

At circle "2", bootstrapping server 204 returns a response to the request to export to bootstrapping client 202. The response includes sealed symmetric key 208 and encrypted cryptographic secret 210. Upon receiving the response, bootstrapping client 202 can store the received sealed symmetric key 208 and encrypted cryptographic secret 210 in a secure location such as a secure file system or secure database for later use.

One potential use for sealed symmetric key 208 and encrypted cryptographic secret 210 is after an event that causes all HSMs 104 of cluster 106 to lose electrical power or otherwise lose secret 206. When electrical power is restored to HSMs 104 of cluster 106, bootstrapping client 202 can send a request to import to each of the HSMs 104 in cluster 106 to restore cryptographic secret 206 to HSMs 104. For example, at circle "3", bootstrapping client 202 sends a request to import to bootstrapping server 204 of HSM-1 104 of cluster 106. For example, bootstrapping client 202 may send the request to import to HSM-1 104 after an event that causes all HSMs 104 of cluster 106 to lose electrical power and after electrical power is restored to HSM-1 104 and it has come back online. The request to import includes the previously exported sealed symmetric key 208 and the encrypted cryptographic secret 210. Upon receiving the request to import, bootstrapping server 204 requests TPM-1 120-1 to unseal sealed symmetric key 208 to yield the symmetric key used to encrypt cryptographic secret 206. Upon obtaining the symmetric key from TPM-1 120-1, bootstrapping server 204 decrypts the encrypted cryptographic secret 210 received in the request to import to yield cryptographic secret 206 in volatile memory of HSM-1 104.

In some embodiments, a bootstrapping client sends a request to export to each HSM in a cluster to obtain a respective sealed symmetric key from each HSM in the cluster. This may be done even if the same symmetric key is used to encrypt the cryptographic secret at each HSM in the cluster because the PCR values of HSMs in the cluster may differ when the symmetric key is sealed at each of the HSMs in the cluster. Bootstrapping client 202 may send the respective sealed symmetric key exported from an HSM to the HSM when importing a secret to the HSM. While in some embodiments the same symmetric key is used to encrypt secrets at each HSM in a cluster, there is no requirement for this, and different symmetric keys may be used at different HSMs in the cluster.

In some embodiments where each HSM in a cluster uses the same symmetric key to encrypt the same cryptographic secret using TPMs that have the same PCR values, the bootstrapping client send a request to export to just one of the HSMs in the cluster to obtain a sealed symmetric key and an encrypted cryptographic secret from that HSM. Then, later, the bootstrapping client can send a request to import to each HSM in the cluster providing the sealed symmetric key and the encrypted cryptographic secret obtained from the one HSM. This may be done, for example, where all HSMs store the same cryptographic secret and all HSMs are expected to be configured identically with respect to aspects measured by PCRs of the TPMs of the HSMs that are bound to the sealed symmetric key or sealed symmetric keys. For example, all TPMs of all HSMs may share the same root cryptographic key used to seal the symmetric key.

The discussion above describes a use case where electrical power is lost to a cluster of HSMs and an exported cryptographic secret or secrets are imported to the HSMs after the electrical power outage is resolved. It should be understood that the cluster of HSMs to which a cryptographic secret or secrets are imported need not be the same cluster of HSMs from which the cryptographic secret or secrets are exported. For example, in response to an electrical power outage, a new cluster of HSMs may be provisioned in the provider network and a previously exported cryptographic secret or secrets imported to the new cluster of HSMs. For successful importation of the cryptographic secret or secrets, the new cluster of HSMs may be configured identically to the cluster of HSMs from which the cryptographic secret or secrets were exported before the electrical power outage with respect to aspects measured by PCRs of TPMs that are bound to the sealed symmetric key or sealed symmetric keys. However, the new cluster of HSMs may encompass physically different devices than the original cluster of HSMs. For example, the new cluster of HSMs may be provisioned in a data center of the provider network that is not affected by the electrical power outage. This use case also illustrates that the techniques described herein can be used to restore secrets to a new cluster of HSMs while an electrical power outage affecting the cluster of HSMs from which the cryptographic secret or secrets were exported is still ongoing and has not yet been resolved.

Example Method for Exporting a Cryptographic Secret

Figure 3:
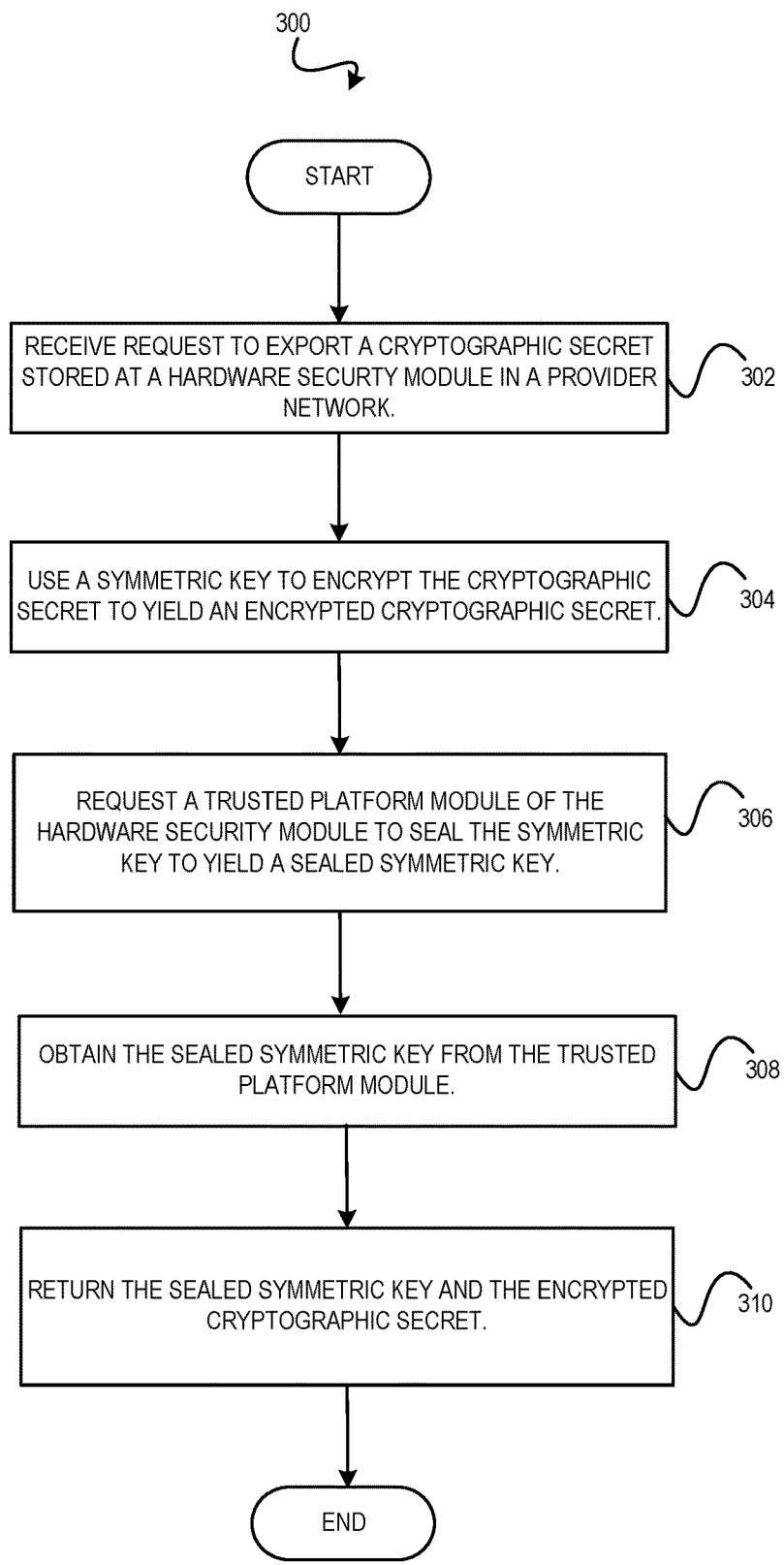
FIG. 3 illustrates an example method for processing a request to export a cryptographic secret at a hardware security module.

FIG. 3 is a flow diagram illustrating operations 300 of a method for exporting a cryptographic secret at an HSM in a cluster of HSMs. Some or all the operations 300 are performed under the control of the HSM, and are implemented as code (e.g., executable instructions, one or more computer programs, or one or more applications) executing collectively on one or more processors. The code is stored on a non-transitory computer-readable medium executable by one or more processors of the HSM. For example, some or all the operations 300 can be performed by bootstrapping server 204 of the other figures.

Operations 300 include, at block 302, a bootstrapping server of the HSM receiving a request to export a cryptographic secret stored at the HSM. For example, the cryptographic secret may be stored in volatile memory of the HSM. The operations 300 further include, at block 304, the bootstrapping server using a symmetric key to encrypt the cryptographic secret to yield an encrypted cryptographic secret. For example, the bootstrapping server can use a symmetric key received in the request to export, a symmetric key generated by and obtained from a TPM of the HSM, a symmetric key generated at the HSM (e.g., using openssl or the like), or a pre-generated key symmetric key.

Operations 300 further include, at block 306, the bootstrapping server of the HSM requesting the TPM of the HSM to seal the symmetric key used to encrypt the cryptographic secret to yield a sealed symmetric key. When sealing the symmetric key, the TPM may use PCRs of the TPM to measure the state of the HSM, including HSM firmware, operating system, or applications. The TPM may then use these measurements to create a PCR composite that represents the state of the HSM at a point in time of the sealing. The PCR composite is a hash value generated by the TPM that is calculated from values of the TPM's PCRs. When sealing the symmetric key, the PCR composite is used by the TPM as part of a sealing policy. The sealing policy defines the conditions under which the sealed symmetric key can be unsealed. For example, the policy might require that the same software applications be running on the HSM as when the symmetric key was sealed, or that the HSM has not been tampered with in any way. The TPM creates the sealed symmetric key as a sealed object by encrypting the symmetric key with a symmetric key of its own that is derived from the TPM's endorsement cryptographic key and the sealing policy. The sealed symmetric key can also include a hash of the sealing policy, including the PCR composite.

Operations 300 further include, at block 308, the bootstrapping server obtaining the sealed symmetric key from the TPM. For example, the bootstrapping server may receive the sealed object in response to requesting the TPM to seal the symmetric key used to encrypt the cryptographic secret.

Operations 300 further include, at block 310, the bootstrapping server returning the sealed symmetric key and the encrypted cryptographic secret to the bootstrapping client that sent the request to export the cryptographic secret from the HSM.

Example Method for Imploring a Cryptographic Secret

Figure 4:
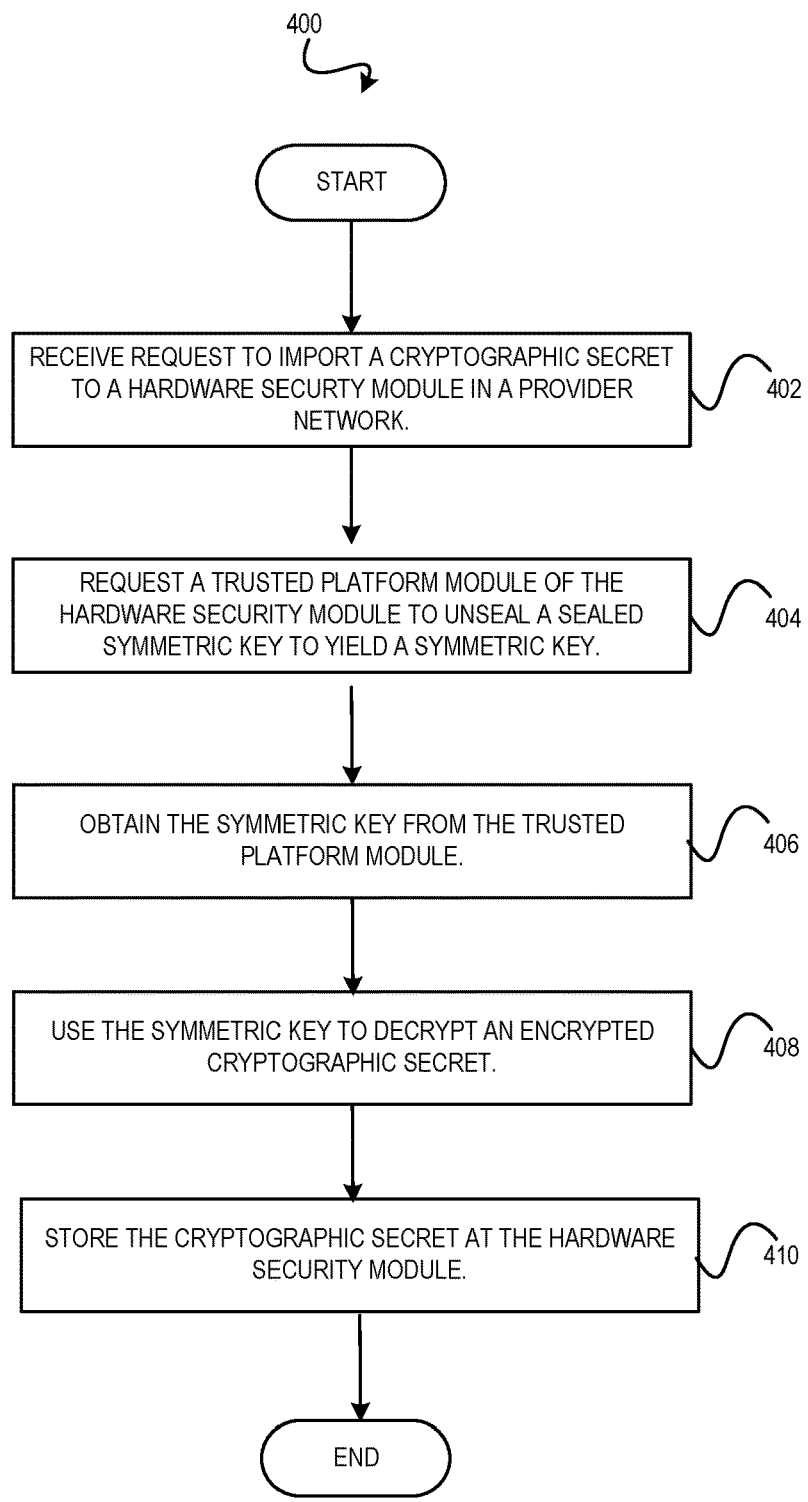
FIG. 4 illustrates an example method for processing a request to import a cryptographic secret at a hardware security module.

FIG. 4 is a flow diagram illustrating operations 400 of a method for importing a cryptographic secret at an HSM in a cluster of HSMs. Some or all the operations 400 are performed under the control of the HSM, and are implemented as code (e.g., executable instructions, one or more computer programs, or one or more applications) executing collectively on one or more processors. The code is stored on a non-transitory computer-readable medium executable by one or more processors of the HSM. Some or all the operations 400 can be performed by bootstrapping server 204 of the other figures.

The operations 400 include, at block 402, a bootstrapping server of the HSM receiving a request to import a cryptographic secret to the HSM. The request to import may include a sealed symmetric key and an encrypted cryptographic secret previously exported from the HSM or another HSM in the cluster (e.g., according to operations 300 of FIG. 3).

The operations 400 further include, at block 404, the bootstrapping server of the HSM requesting the TPM of the HSM to unseal the sealed symmetric key to yield the symmetric key used to encrypt the secret during export. To unseal the sealed symmetric key, the TPM checks the current state of the HSM by measuring values in PCRs of the TPM and creates a PCR composite based on the measured values. The TPM then compares the PCR composite to the hash of the sealing policy that is part of the sealed symmetric key. If the comparison is a match, then the TPM can use its root cryptographic key (or a cryptographic key derived therefrom) to decrypt (unseal) the sealed symmetric key to yield the (unsealed) symmetric key and return the unsealed symmetric key to the bootstrapping server. If the values do not match, then the TPM will not decrypt (unseal) the sealed symmetric key.

The operations 400 further include, at block 406, the bootstrapping server obtaining the unsealed symmetric key from the TPM.

The operations 400 further include, at block 408, the bootstrapping server using the unsealed symmetric key to decrypt the encrypted cryptographic secret received in the request to import.

The operations 400 further include, at block 410, the bootstrapping server storing the decrypted secret in volatile memory of the HSM thereby restoring the secret to the HSM for use by the HSM to perform cryptographic operations.

In some examples described herein, the encrypted cryptographic secret is returned in response to a request to export sent to an HSM. The encrypted cryptographic secret is then included in a subsequent request to import sent to the HSM. However, an alternative is to store the encrypted cryptographic secret at the HSM at which it is generated for later retrieval and use. In this case, the response to a request to export sent to the HSM need not include the encrypted cryptographic secret but instead may include only a reference or identifier of the encrypted cryptographic secret as stored at the HSM or may not reference or identify the encrypted cryptographic secret at all. For example, the encrypted cryptographic secret may be stored at a predetermined file system location of the HSM or in the TPM of the HSM. A subsequent request to import the encrypted cryptographic secret to the HSM can simply refer to or identify the encrypted cryptographic secret that is already stored at the HSM or otherwise request that the encrypted cryptographic secret stored at the HSM be imported. In this way, the encrypted cryptographic secret does not leave the secure confines of the HSM and does not require an external storage solution for storing the encrypted cryptographic secret between the time of export and the time of import.

Further, since the encrypted cryptographic secret is encrypted, it is not available to unauthorized persons or systems in plaintext form.

Following the above described alternative, at block 310 of FIG. 3, the bootstrapping server of the HSM can store the sealed symmetric key or the encrypted cryptographic secret at the HSM instead of returning the sealed symmetric key or the encrypted cryptographic secret to the bootstrapping client. For example, the encrypted cryptographic secret or the sealed symmetric key may be stored at a pre-determined file system location of the HSM or in the TPM of the HSM. Then, at block 402 of FIG. 4, the request to import need not include the sealed symmetric key or the encrypted cryptographic secret previously stored at the HSM in response to the request to export. Instead, the request to import refers to or identifies the sealed symmetric key or the encrypted cryptographic secret. For example, the request to import can refer to or identify the cryptographic key or the secret by a filename or a file system location. Alternatively, if the cryptographic key or secret are stored in a predefined location(s) at the HSM (e.g., predefined file system location(s)), the request to import need not refer to or identify the cryptographic key or the secret. In that case, the request to import by itself is sufficient indication to the HSM that the cryptographic key or the secret is to be retrieved from the predefined location(s) and the secret imported to the HSM.

In some embodiments, the request to export specifies the file system location of the HSM of where to store the encrypted cryptographic secret and a subsequent request to import includes the specified file system location from which the HSM can retrieve the encrypted cryptographic secret.

While in some embodiments the encryption key used to encrypt and decrypt the secret is a symmetric key, an asymmetric key pair can be used. A TPM may have a limit on the size of the data it can seal and unseal. For example, the limit may be 256 bytes. A symmetric key is typically smaller in size than an asymmetric key pair. Thus, a symmetric key may be more suitable for encrypting and decrypting the secret than an asymmetric key pair. However, an asymmetric key pair could be used if it is within the sealing data size limits of the TPM. For example, the secret can be encrypted using the public key of an asymmetric key pair and the private key of the asymmetric key pair sealed to the TPM provided the private key is within the sealing data size limits of the TPM. As another alternative, an asymmetric key pair can be used to generate a symmetric key that is used to encrypt and decrypt the secret and the generated symmetric key sealed to the TPM.

While in some embodiments an intermediate encryption key that is sealed to the TPM is used to encrypt and decrypt the secret, the secret may be directly sealed to the TPM if the size of the secret is within the sealing data size limits of the TPM. In this case, an intermediate cryptographic key is not needed.

Figure 5:
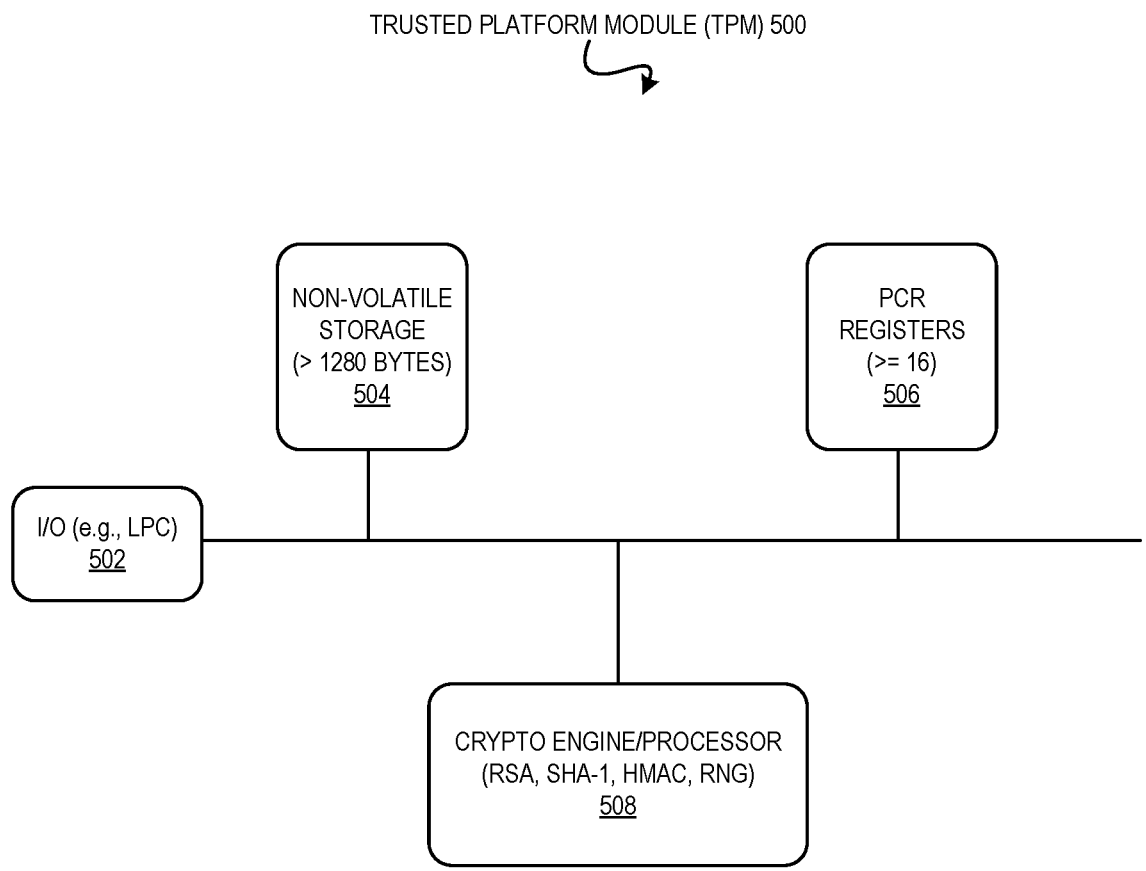
FIG. 5 illustrates components of an example trusted platform module.

FIG. 5 illustrates components of TPM 500 that may be connected or integrated with a server computer or a HSM in a provider network. The components include I/O interface 502, non-volatile storage 504, PCR registers 506, and crypto engine/processor 508. Non-volatile storage 504 may contain a root cryptographic key (e.g., a 2048-bit RSA key) that is created at the time of manufacturing TPM 500 and that cannot be changed. Non-volatile storage 504 may contain a root cryptographic key (e.g., a 2048-bit RSA key) that is used by TPM 500 for implementing encrypted storage using non-volatile storage 504. The root cryptographic key is created by TPM 500 of its host HSM is running (booted).

The root cryptographic key can be cleared from TPM 500 at a later time from the HSM BIOS. The top-level cryptographic key and the root cryptographic key never leave TPM 500.

PCR registers 506 include at least 16 registers. A register contains a SHA-1 digest or other type of cryptographic message digest that is extended such that a new message digest stored in a register is generated based on the existing message digest in the register. A register may be initialized to a default value (e.g., 0) at boot and then extended during the boot process of the HSM. For example, initially a register may be initialized to zero, extended with a message digest of BIOS code, extended further with a message digest of master boot record code, extended even further with operating system loader code, extended even further with application code, and so on. After booting of the HSM, PCR registers 506 may contain a hash chain of software booted, loaded, or installed on the HSM.

TPM 500 is capable of sealing and unsealing data. TPM 500 may offer an API by which a caller (e.g., bootstrapping server 204) can specify a encryption key of TPM 500 stored in non-volatile storage 504 to encrypt the data with, a password, which of PCR registers 506 to seal the data with, and the data itself which may have a data size limit (e.g., 256 bytes). An encrypted data blob is returned to the caller. The blob can only be decrypted by TPM 500 when the values of PCR registers 506 that the data was sealed with equal the values of those registers sealed in the blob. For example, if the master boot record (MBR) or the operating system kernel of the HSM is tampered with between the time TPM 500 seals data and the time TPM 500 attempts to unseal the data, then the values in PCR registers 506 at the time of the unseal attempt will be different that the values of those registers sealed in the sealed data blob and the unseal attempt will fail.

Provider Network

Figure 6:
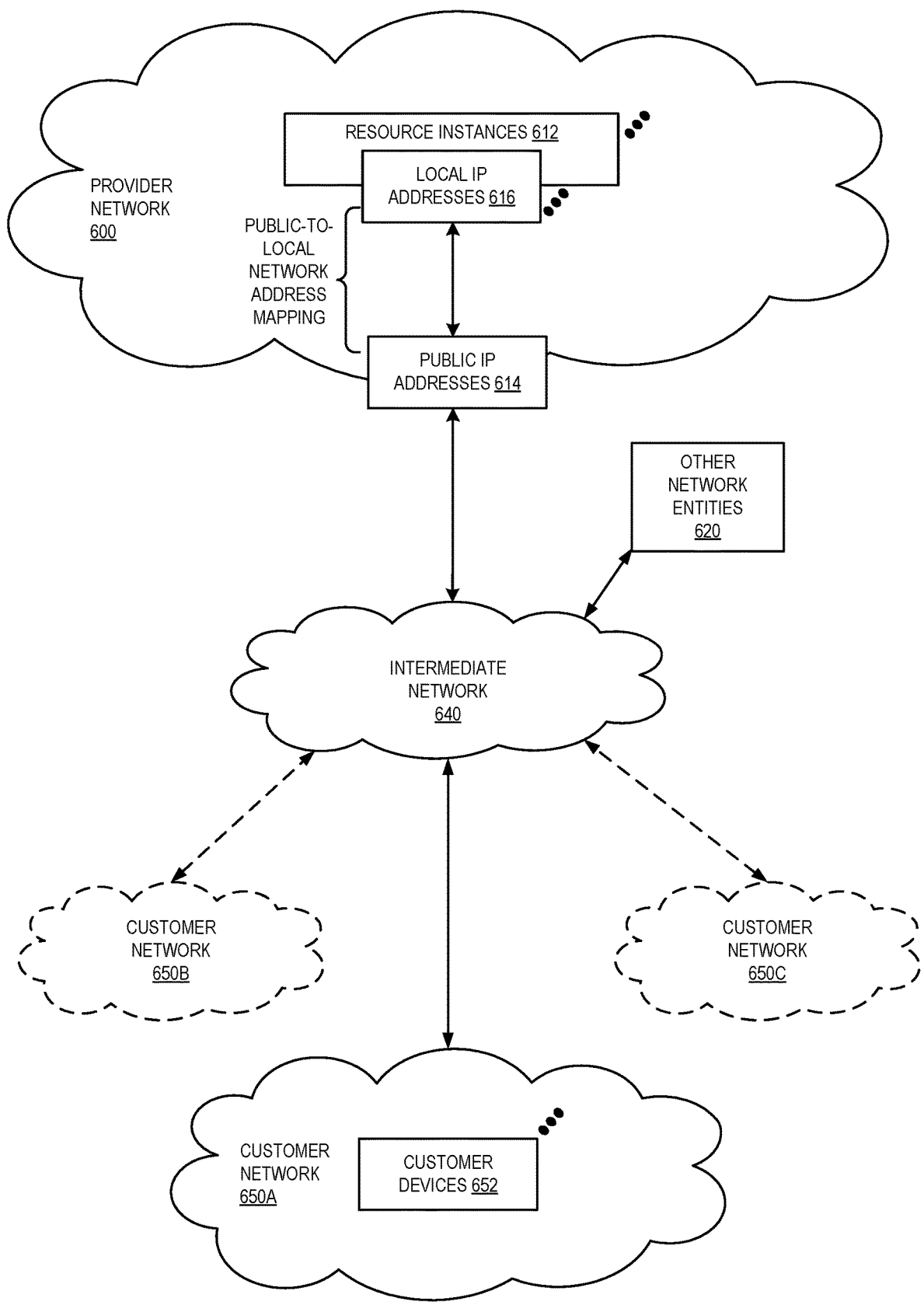
FIG. 6 illustrates an example provider network environment according to some examples.

FIG. 6 illustrates provider network 600. Provider network 600 provides resources to customers via services that allow customers to purchase, rent, or otherwise obtain instances 612 of resources, including but not limited to computing, networking, and data storage resources, implemented on electronic devices within provider network 600 in one or more data centers.

Local Internet Protocol (IP) addresses 616 are associated with resource instances 612. Local IP addresses 616 are the internal network addresses of resource instances 612 in provider network 600. Provider network 600 also uses public IP addresses 614. Provider network 600 allows customers (e.g., customers that operates customer networks 650A-650C (or "client networks") including customer devices 652) to dynamically associate public IP addresses 614 provisioned to the customers with resource instances 612 provisioned to the customers. Provider network 600 also allows the customers to remap public IP address 614 provisioned to the customers between resource instances 612 provisioned to the customers.

Using resource instances 612 and public IP addresses 614, customers can implement customer-specific applications and offer them on intermediate network 640, such as the Internet. Other network entities 620 on intermediate network 640 can then generate request traffic to public IP address 614. The request traffic is routed from other network entities 620 through intermediate network 640 to provider network 600. The request traffic received at provider network 600 is routed to local IP addresses 616 of resource instances 612 which process (handle) the request traffic. Response traffic generated by resource instances 612 is routed onto intermediate network 640 back to other network entities 620.

Local IP addresses 616 are internal or private network addresses of resource instances 612. For example, local IP addresses 616 can be within address blocks reserved by Internet Engineering Task Force (IETF) Request for Comments (RFC) 1918 or of an address format specified by IETF RFC 4193 and can be mutable within provider network 610. Network traffic originating outside provider network 610 is not directly routed to local IP addresses 616. Instead, the traffic uses public IP addresses 614 that are mapped to local IP addresses 616. Provider network 600 can include networking devices or appliances that provide network address translation (NAT) or similar functionality to perform the mapping between public IP addresses 614 and local IP addresses 616.

Provider network 600 can provide its capabilities to customers according to one or more of a variety of different service models including Software-as-a-Service (SaaS), Platform-as-a-Service (PaaS), Infrastructure-as-a-Service (IaaS), or any other provider network service model.

With SaaS, a capability is provided to customers using software applications of provider network 600 and running on the infrastructure of the provider network 600. The applications may be accessible from various remote electronic devices through either a thin client interface such as a command line interface (CLI), a graphical user interface (GUI) (e.g., via a web browser or a mobile or web application), a Software Development Kit (SDK), or any other interface. The infrastructure of provider network 600 includes the hardware resources such as server, storage, and network resources and software deployed on the hardware infrastructure that support the services being provided. Typically, under the SaaS model, customers do not manage or control the underlying infrastructure including network, servers, operating systems, storage, or individual application capabilities, except for limited customer-specific application configuration settings.

With PaaS, customers are provided the capability to deploy, onto hardware and software infrastructure of provider network 600, customer-created or acquired applications using programming languages, libraries, services, and tools supported by provider network 600 or other sources. Typically, under the PaaS model, customers do not manage or control the underlying hardware and software infrastructure including network, servers, operating systems, or storage, but can have control over the deployed applications and possibly configuration settings for the application-hosting environment.

With IaaS, customers are provided the capability to provision processing, storage, networks, and other fundamental computing resources where the customers can deploy and run arbitrary software, which can include operating systems and applications. The customers typically do not manage or control the underlying hardware and software infrastructure but can have control over operating systems, storage, and deployed applications and possibly limited control of selecting network components such as, for example, host firewalls.

Provider network 600 can provide its capabilities to customers according to one or more of a variety of different deployment models including as a private cloud, as a community cloud, as a public cloud, as a hybrid cloud, or any other provider network deployment model.

In a private cloud, the hardware and software infrastructure of provider network 600 is provisioned for exclusive use by a single organization which can comprise multiple customers. The private cloud is owned, managed, and operated by the organization, a third party, or some combination of them, and it can exist on or off premises.

In a community cloud, the hardware and software infrastructure of provider network 600 is provisioned for exclusive use by a specific community of customers from organizations that have shared concerns such as mission security requirements, policy, and compliance considerations. The community cloud is owned, managed, and operated by one or more of the organizations in the community, a third party, or some combination of them, and it can exist on or off premises.

In a public cloud, the infrastructure is provisioned for open use by the public. The public cloud is owned, managed, and operated by a business, academic, or government organization, or some combination of them. A public cloud can exist on the premises of the public cloud provider.

In a hybrid cloud, the infrastructure is a composition of two or more distinct cloud infrastructures (private, community, public, or any other cloud infrastructure) that remain unique entities, but that are bound together by standardized or proprietary technology that enables data and application portability such as, for example, cloud bursting for load balancing between clouds.

Computer System

Figure 7:
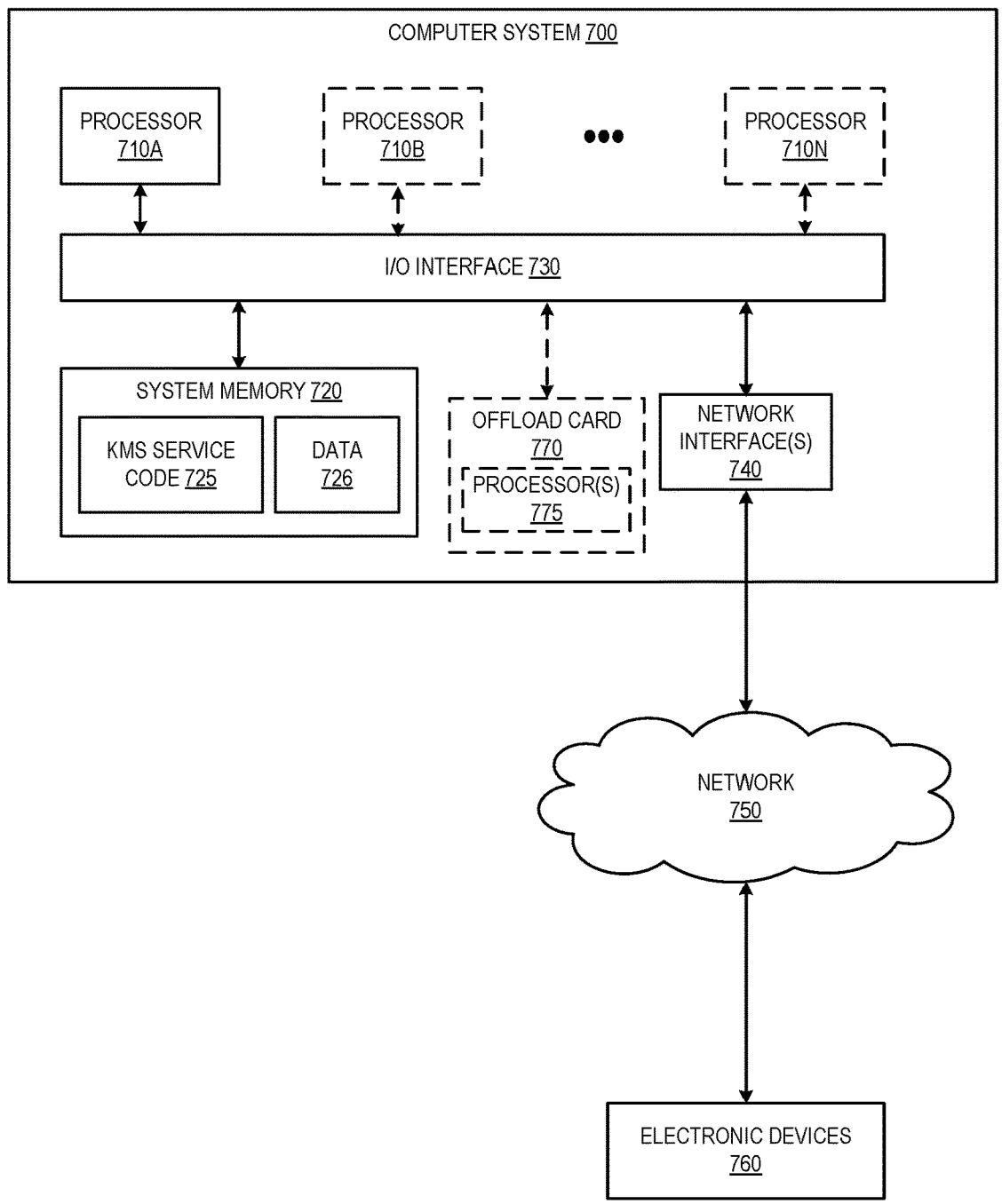
FIG. 7 is a block diagram illustrating an example computer system that can be used in some examples.

A system that implements a portion or all the techniques described herein can include a general-purpose computer system (also referred to herein as a "computing device"). FIG. 7 illustrates computer system 700. Computer system 700 includes one or more processors 710A-N coupled to system memory 720 via input/output (I/O) interface 730. Computer system 700 further includes network interface 740 coupled to I/O interface 730. While computer system 700 can be a single computing device, computer system 700 can encompass one computing device, or any number of computing devices configured to work together as a single computer system.

Computer system 700 can be a uniprocessor system including one processor 710, or a multiprocessor system including several processors 710A-N (e.g., two, four, eight, or another suitable number). Each processor 710A-N can be any suitable hardware processor capable of executing instructions and its functionality implemented at least in part by integrated circuitry composed of semiconductor material (e.g., silicon), but its functionality can additionally be implemented by software (e.g., firmware). For example, each processor 710A-N can be general-purpose or embedded microprocessor implementing an instruction set architecture (ISAs) such as x86, ARM, PowerPC, SPARC, or MIPS.

System memory 720 stores instructions and data accessible by processor(s) 710. Program instructions and data implementing one or more desired functions, such as those methods, techniques, and data described above, are shown stored within the system memory 720 as cryptographic key management service ("KMS") code 725 (e.g., executable to implement, in whole or in part, provider network 100) and data 726.

System memory 720 is a non-transitory computer-readable medium such as, for example, a volatile or a non-volatile computer-readable medium. Non-limiting examples of electronic devices that encompass volatile computer-readable media include random-access memory (RAM) devices and cache memory devices. For example, system memory 720 may be implemented at least in part by dynamic random-access memory (DRAM) devices or static random-access memory (SRAM) devices. Non-limiting examples of electronic devices that encompass non-volatile computer-readable media include read-only memory (ROM) devices, hard disk drives, solid-state drives, flash drives, magnetic tape drives, optical disk drives, and other types of memory cards. For example, system memory 720 may be implemented at least in part by any or all of: flash memory devices, magnetic disk storage devices, optical disk storage devices, phase-change memory (PCM) devices, ferroelectric RAM (FRAM) devices, magnetoresistive RAM (MRAM) devices, resistive RAM (RRAM) devices, mask ROM devices, programmable ROM (PROM) devices, erasable programming ROM (EPROM) devices, or electrically erasable programmable ROM (EEPROM) devices. Non-transitory computer-readable media is distinct from, but may be used in conjunction with, transitory electronic signals, electromagnetic carrier waves, and other transitory signals.

I/O interface 730 is configured to coordinate I/O traffic between processor(s) 710, system memory 720, and any peripheral devices, including network interface 740. I/O interface 730 performs protocol, timing, or other data transformations to convert data signals from one component (e.g., system memory 720) into a format suitable for use by another component (e.g., processor(s) 710). I/O interface 730 can include support for devices attached through various types of peripheral buses such as, for example, a Peripheral Component Interconnect (PCI) bus, a QuickPath interconnect (QPI) bus, a UltraPath interconnect (UPI) bus, a Universal Serial Bus (USB), or other suitable bus. A function of I/O interface 730 can be split into two or more separate components such as, for example, a north bridge and a south bridge. Some or all the functionality of I/O interface 730 such as, for example, an interface to system memory 720, can be incorporated directly into processor(s) 710.

Network interface 740 allows data to be exchanged between computer system 700 and electronic devices 760 attached to network 750. Network interface 740 supports communication via any suitable wired or wireless data networks such as, for example, a wired or wireless Ethernet networks. Additionally or alternatively, network interface 740 supports communication via telecommunications or telephony networks, such as analog voice networks or digital fiber communications networks, via storage area networks (SANs), such as Fibre Channel SANs, or via any other suitable type of network or protocol.

Computer system 700 optionally includes offload card 770. Offload card 770 includes one or more processors 775 and possibly includes network interfaces 740. Offload card 770 is connected to I/O interface 730. For example, computer system 700 can act as a host for compute instances such as, for example, virtual machine instances or container instances. In this case, processor(s) 775 of offload card 770 can execute a virtualization manager that manages compute instances that execute on processor(s) 710. The virtualization manager can perform compute instance management operations such as, for example, pausing or un-pausing compute instances, launching or terminating compute instances, performing memory transfer/copying operations, etc. These management operations can be performed in coordination with a hypervisor that is executed by processor(s) 710. Additionally or alternatively, the virtualization manager can perform management operations in coordination with other entities executed by processor(s) 710 such as, for example, the compute instances themselves.

Terminology

Ordinal terms such as first, second, etc. may be used in the foregoing description and in the appended claims to describe various elements, features, acts, or operations. Unless the context clearly indicates otherwise, such elements, features, acts, or operations are not limited by those terms. The terms are used only to distinguish one element, feature, act, or operation from another. For example, a first device could be termed a second device. The first device and the second device are both devices, but they are not the same device.

Unless the context clearly indicates otherwise, as used in the foregoing description and in the appended claims, the singular forms "a," "an," and "the" are intended to include the plural forms as well.

Unless the context clearly indicates otherwise, as used in the foregoing description and in the appended claims, the terms "comprising," "including," "having," "based on," "encompassing," and other like terms, are used in the foregoing description and in the appended claims in an open-ended fashion, and do not exclude additional elements, features, acts, or operations.

Unless the context clearly indicates otherwise, the term "based on" (or similar) as used in this description or in the appended claims is an open-ended term used to describe one or more factors that affect or cause a determination or action and does not foreclose additional factors that may affect or cause a determination or action. For example, a determination or action may be affected or caused based solely on the factor(s) listed or based on the factor(s) listed and one or more additional factors.

Unless the context clearly indicates otherwise, the term "or" is used in the foregoing description and in the appended claims in its inclusive sense (and not in its exclusive sense) so that when used, for example, to connect a list of elements, features, acts, or operations, the term "or" means one, some, or all the elements, features, acts, or operations in the list.

Unless the context clearly indicates otherwise, conjunctive language in the foregoing description and in the appending claims such as the phrase "at least one of X, Y, and Z," is to be understood to convey that an item, term, etc. can be either X, Y, or Z, or a combination thereof. Thus, such conjunctive language does not require that at least one of X, at least one of Y, and at least one of Z to each be present.

What is claimed is:

1. A computer-implemented method comprising:
    before an event that causes a cluster of a plurality of hardware security modules to lose electrical power:
        receiving, at a particular hardware security module of the cluster, a request to export a cryptographic secret used by the particular hardware security module to perform a cryptographic operation; and
        in response to receiving the request to export the cryptographic secret:
            using, at the particular hardware security module, a symmetric key to encrypt the cryptographic secret to yield an encrypted cryptographic secret;
            requesting, at the particular hardware security module, a trusted platform module of the particular hardware security module to seal the symmetric key to yield a sealed symmetric key; and
            returning the sealed symmetric key and the encrypted cryptographic secret;
    after the event that causes the cluster of the plurality of hardware security modules to lose electrical power:
        receiving, at the particular hardware security module, a request to import the cryptographic secret to the particular hardware security module, the request to import comprising the sealed symmetric key and the encrypted cryptographic secret; and in response to receiving the request to import the cryptographic secret to the particular hardware security module:
  requesting, at the particular hardware security module, the trusted platform module to unseal the sealed symmetric key to yield an unsealed symmetric key;
  using, at the particular hardware security module, the unsealed symmetric key to decrypt the encrypted cryptographic secret to yield a decrypted cryptographic secret; and
  using, at the particular hardware security module, the decrypted cryptographic secret to perform a cryptographic operation.

2. The computer-implemented method of claim 1, wherein the cryptographic secret comprises a private key of an asymmetric key pair, a symmetric key, or a self-signed digital certificate.

3. The computer-implemented method of claim 1, wherein each hardware security module of the cluster of the plurality of hardware security modules uses the cryptographic secret to perform a cryptographic operation.

4. A computer-implemented method comprising:
  before an event that causes a server computer to lose electrical power:
  receiving, at a server computer, a request to export a secret used by the server computer to perform a cryptographic operation; and
  in response to receiving the request to export the secret:
    using, at the server computer, a symmetric key to encrypt the secret to yield an encrypted secret;
    requesting, at the server computer, a trusted platform module of the server computer to seal the symmetric key to yield a sealed symmetric key; and
    returning the sealed symmetric key and the encrypted secret;
  after the event that causes the server computer to lose electrical power:
  receiving, at the server computer, a request to import the secret to the server computer, the request to import comprising the sealed symmetric key and the encrypted secret; and
  in response to receiving the request to import the secret to the server computer:
    requesting, at the server computer, the trusted platform module to unseal the sealed symmetric key to yield an unsealed symmetric key;
    using, at the server computer, the unsealed symmetric key to decrypt the encrypted secret to yield a decrypted secret; and
    using, at the server computer, the decrypted secret to perform a cryptographic operation.

5. The computer-implemented method of claim 4, wherein the server computer belongs to a cluster of a plurality of server computers in a provider network; and wherein each server computer of the plurality of server computers uses the secret to perform a cryptographic operation.

6. The computer-implemented method of claim 4, wherein the secret comprises a private key of an asymmetric key pair, a symmetric key, or a self-signed digital certificate.

7. The computer-implemented method of claim 4, wherein the server computer belongs to a cluster of a plurality of server computers in a provider network; and wherein the event causes the plurality of server computers to lose electrical power.

8. The computer-implemented method of claim 4, wherein the request to export comprises the symmetric key.

9. The computer-implemented method of claim 4, further comprising:
  generating, at the server computer, the symmetric key.

10. The computer-implemented method of claim 4, further comprising:
  in response to receiving the request to export, retrieving, by the server computer, the symmetric key from a database, a file system, or another device.

11. The computer-implemented method of claim 4, wherein the server computer is certified according to a Federal Information Processing Standard (FIPS).

12. The computer-implemented method of claim 4, wherein the sealed symmetric key comprises a cryptographic digest of one or more values of one or more platform configuration registers (PCRs) of the trusted platform module at a time of sealing the symmetric key.

13. The computer-implemented method of claim 12, wherein one or more values of the one or more platform configuration registers (PCRs) of the trusted platform module at a time of unsealing the sealed symmetric key equal the one or more values of the one or more platform configuration registers (PCRs) of the trusted platform module at the time of sealing the symmetric key.

14. The computer-implemented method of claim 4, wherein the secret is stored at the server computer exclusively in volatile memory of the server computer.

15. A system comprising:
  a first set of electronic devices to implement a distributed application in a provider network;
  a second set electronic devices to implement a cryptographic key management service in the provider network, the cryptographic key management service comprising a cluster of a plurality of hardware security modules configured to use a cryptographic secret to perform cryptographic operations for the distributed application; and
  a third set of one or more electronic devices to implement a cryptographic secret bootstrapping client in the provider network, the cryptographic secret bootstrapping client comprising instructions which when executed cause the cryptographic secret bootstrapping client to perform operations comprising:
    before an event that causes the plurality of hardware security modules to lose electrical power: sending to each hardware security module, of the plurality of a hardware security modules, a respective request to export the cryptographic secret from the hardware security module; and receiving a respective sealed symmetric key from each hardware security module of the plurality of hardware security modules; and
    after the event that causes the plurality of hardware security modules to lose electrical power: sending, to each hardware security module, of the plurality of hardware security modules, a respective request to import the cryptographic secret to the hardware security module, the respective request to import comprising the respective sealed symmetric key received from the hardware security module.

16. The system of claim 15, wherein the cryptographic secret comprises a private key of an asymmetric key pair, a symmetric key, or a self-signed digital certificate.

17. The system of claim 15, wherein each hardware security module of the plurality of hardware security modules is configured to request a trusted platform module of the hardware security module to unseal the respective sealed symmetric key for the hardware security module to yield a respective symmetric key for the hardware security module.

18. The system of claim 15, wherein each hardware security module of the plurality of hardware security modules is configured to use a respective symmetric key for the hardware security module to decrypt an encrypted cryptographic secret to yield the cryptographic secret.

19. The system of claim 15, wherein each hardware security module of the plurality of hardware security modules is configured to use the cryptographic secret to perform a cryptographic operation for the distributed application.

20. The system of claim 15, wherein the first set of electronic devices, the second set of electronic devices, and the third set of one or more electronic devices are all located in a same zone of the provider network.

* * * * *